US012294757B2

(12) United States Patent
Bellerjeau et al.

(10) Patent No.: US 12,294,757 B2
(45) Date of Patent: May 6, 2025

(54) SYSTEMS AND METHODS FOR ADJUSTING A VIEWING ENVIRONMENT

(71) Applicant: DISH Network L.L.C., Englewood, CO (US)

(72) Inventors: Amber Bellerjeau, Littleton, CO (US); Luke E. VanDuyn, Conifer, CO (US); Caroline Condon, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/090,315

(22) Filed: Dec. 28, 2022

(65) Prior Publication Data

US 2024/0223838 A1    Jul. 4, 2024

(51) Int. Cl.
*H04N 21/422* (2011.01)
*H04N 21/41* (2011.01)

(52) U.S. Cl.
CPC ... *H04N 21/42222* (2013.01); *H04N 21/4131* (2013.01)

(58) Field of Classification Search
None
See application file for complete search history.

(56) References Cited

U.S. PATENT DOCUMENTS

| 8,134,475 | B2 | 3/2012 | Reams | |
| 10,958,457 | B1* | 3/2021 | Davis | H04L 12/2803 |
| 2013/0141011 | A1* | 6/2013 | Fushimi | H05B 47/10 |
| | | | | 315/294 |
| 2016/0091877 | A1* | 3/2016 | Fullam | F24F 11/30 |
| | | | | 700/275 |
| 2017/0277373 | A1* | 9/2017 | Jeong | H05B 47/105 |
| 2019/0338587 | A1* | 11/2019 | Boyd | F24F 11/63 |
| 2020/0397936 | A1* | 12/2020 | Deros | F24F 8/22 |

* cited by examiner

*Primary Examiner* — Samira Monshi
(74) *Attorney, Agent, or Firm* — Perkins Coie LLP

(57) ABSTRACT

A viewing environment adjustment system, including: one or more sensors each configured to monitor an aspect of the viewing environment; one or more processors; and one or more memory devices having stored thereon instructions that when executed by the one or more processors cause the one or more processors to: determine that media content is being displayed on a display located in the viewing environment; receive data from the one or more sensors; and adjust a corresponding aspect of the viewing environment based on the received data exceeding a selected threshold value in response to determining that media content is being displayed.

20 Claims, 6 Drawing Sheets

SYSTEMS AND METHODS FOR ADJUSTING A VIEWING ENVIRONMENT

BACKGROUND

Glare at certain times of the day can make it difficult to see media content displayed on a television screen, for example. This is particularly frustrating when watching a movie that is relatively dark, such as when the story takes place at night.

SUMMARY

In some aspects, the techniques described herein relate to a viewing environment adjustment system, including: one or more sensors each configured to monitor an aspect of the viewing environment; one or more processors; and one or more memory devices having stored thereon instructions that when executed by the one or more processors cause the one or more processors to: determine that media content is being displayed on a display located in the viewing environment; receive data from the one or more sensors; and adjust a corresponding aspect of the viewing environment based on the received data exceeding a selected threshold value in response to determining that media content is being displayed.

In some aspects, the techniques described herein relate to a system, wherein the one or more sensors includes an ambient light sensor and adjusting the corresponding aspect of the viewing environment includes adjusting a window covering associated with the viewing environment to reduce the amount of light entering the viewing environment through the window covering.

In some aspects, the techniques described herein relate to a system, wherein the ambient light sensor is carried by a remote control.

In some aspects, the techniques described herein relate to a system, wherein the one or more sensors includes a temperature sensor and adjusting the corresponding aspect of the viewing environment includes adjusting a thermostat associated with the viewing environment.

In some aspects, the techniques described herein relate to a system, wherein the one or more sensors includes a temperature sensor and adjusting the corresponding aspect of the viewing environment includes adjusting a window covering associated with the viewing environment to reduce the amount of solar radiation entering the viewing environment through the window covering.

In some aspects, the techniques described herein relate to a system, wherein the one or more sensors includes an ambient light sensor and adjusting the corresponding aspect of the viewing environment includes turning off a light located in the viewing environment.

In some aspects, the techniques described herein relate to a method for adjusting a viewing environment, including: determining that media content is being displayed on a display located in the viewing environment; receiving data related to one or more aspects of the viewing environment; and adjusting a corresponding aspect of the viewing environment based on the received data exceeding a selected threshold value in response to determining that media content is being displayed.

In some aspects, the techniques described herein relate to a method, wherein the data related to one or more aspects of the viewing environment is received from an ambient light sensor and adjusting the corresponding aspect of the viewing environment includes adjusting a window covering associated with the viewing environment to reduce the amount of light entering the viewing environment through the window covering.

In some aspects, the techniques described herein relate to a method, wherein the ambient light sensor is carried by a remote control.

In some aspects, the techniques described herein relate to a method, wherein the data related to one or more aspects of the viewing environment is received from a temperature sensor and adjusting the corresponding aspect of the viewing environment includes adjusting a thermostat associated with the viewing environment.

In some aspects, the techniques described herein relate to a method, wherein the data related to one or more aspects of the viewing environment is received from a temperature sensor and adjusting the corresponding aspect of the viewing environment includes adjusting a window covering associated with the viewing environment to reduce the amount of solar radiation entering the viewing environment through the window covering.

In some aspects, the techniques described herein relate to a method, wherein the data related to one or more aspects of the viewing environment is received from an ambient light sensor and adjusting the corresponding aspect of the viewing environment includes turning off a light located in the viewing environment.

In some aspects, the techniques described herein relate to a method, wherein the data related to one or more aspects of the viewing environment is received from a weather report and adjusting the corresponding aspect of the viewing environment includes adjusting a window covering associated with the viewing environment to reduce the amount of light entering the viewing environment through the window covering.

In some aspects, the techniques described herein relate to one or more non-transitory computer-readable media storing computer-executable instructions that, when executed by one or more processors, cause the one or more processors to perform operations including: determining that media content is being displayed on a display located in the viewing environment; receiving data related to one or more aspects of the viewing environment; and adjusting a corresponding aspect of the viewing environment based on the received data exceeding a selected threshold value in response to determining that media content is being displayed.

In some aspects, the techniques described herein relate to one or more non-transitory computer-readable media, wherein the data related to one or more aspects of the viewing environment is received from an ambient light sensor and adjusting the corresponding aspect of the viewing environment includes adjusting a window covering associated with the viewing environment to reduce the amount of light entering the viewing environment through the window covering.

In some aspects, the techniques described herein relate to one or more non-transitory computer-readable media, wherein the ambient light sensor is carried by a remote control.

In some aspects, the techniques described herein relate to one or more non-transitory computer-readable media, wherein the data related to one or more aspects of the viewing environment is received from a temperature sensor and adjusting the corresponding aspect of the viewing environment includes adjusting a thermostat associated with the viewing environment.

In some aspects, the techniques described herein relate to one or more non-transitory computer-readable media, wherein the data related to one or more aspects of the viewing environment is received from a temperature sensor and adjusting the corresponding aspect of the viewing environment includes adjusting a window covering associated with the viewing environment to reduce the amount of solar radiation entering the viewing environment through the window covering.

In some aspects, the techniques described herein relate to one or more non-transitory computer-readable media, wherein the data related to one or more aspects of the viewing environment is received from an ambient light sensor and adjusting the corresponding aspect of the viewing environment includes turning off a light located in the viewing environment.

In some aspects, the techniques described herein relate to one or more non-transitory computer-readable media, wherein the data related to one or more aspects of the viewing environment is received from a weather report and adjusting the corresponding aspect of the viewing environment includes adjusting a window covering associated with the viewing environment to reduce the amount of light entering the viewing environment through the window covering.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
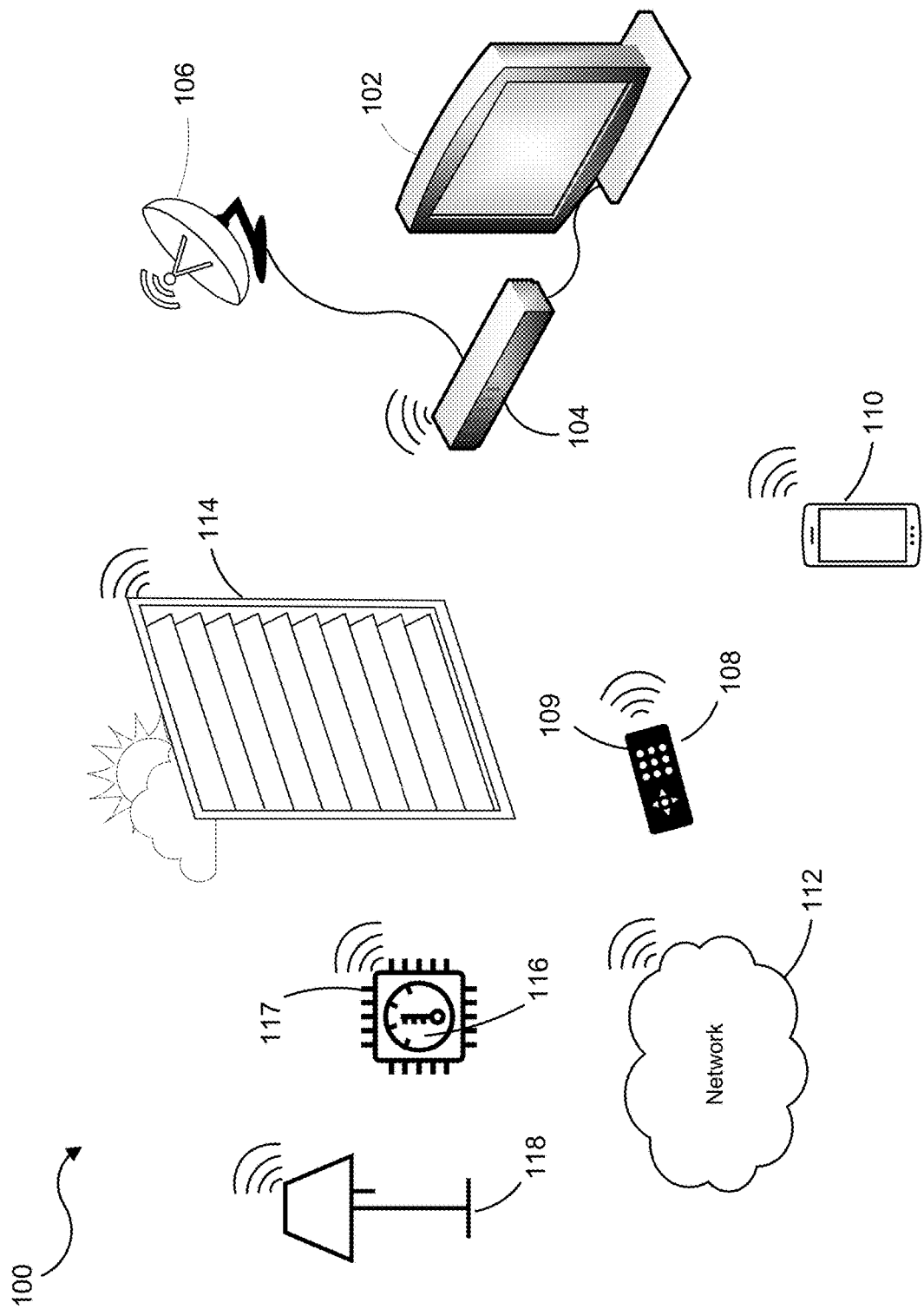
FIG. 1 is a diagram illustrating an overview of a system for adjusting a viewing environment according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a simplified block diagram of a system 100 for adjusting a viewing environment. The system 100 can include a set-top-box (STB) 104 and a remote control 108 associated with the STB 104. In some embodiments, the STB 104 can be in communication with a television 102 and a satellite-based television distribution system via a satellite dish 106, for example.

Satellite-based television distribution systems often include one or more satellites and satellite transmission equipment (not shown). Although the system is described with respect to a satellite-based distribution system, cable, IP-based, wireless, and broadcast focused systems are also possible. Accordingly, in some embodiments a STB is not necessary to implement the disclosed technology. For example, a controller can include wireless capabilities (e.g., 4G, 5G, and the like) to receive one or more data streams corresponding to broadcast events. In some embodiments, the STB can have capabilities of a conventional STB along with Wi-Fi gateway capability and multiple Bluetooth® communication capabilities (e.g., more than two).

As noted above, glare at certain times of the day can make it difficult to see media content displayed on a screen, such as television 102. This is particularly frustrating when watching a movie that is relatively dark, such as when the story takes place at night. The disclosed technology provides a novel solution to this problem by determining when media content (e.g., movie) is being displayed on a display located in the viewing environment and adjusting aspects of the viewing environment accordingly. In some embodiments, the system 100 can include or be in communication with one or more sensors to monitor an aspect of the viewing environment and one or more devices to adjust a corresponding aspect of the viewing environment. For example, an ambient light sensor 109 can be carried by the remote 108. The ambient light in the environment (e.g., room) can be adjusted by closing or opening an automatic window covering or a motorized blind 114 based on data received from the light sensor 109. Similarly, a light 118 can be turned on, off, or dimmed based on the light sensor 109. In some embodiments, the system 100 can include or be in communication with a temperature sensor 117 carried by a thermostat 116 that is associated with the viewing environment. Based on data received from the temperature sensor 117 the system can cause the thermostat to adjust the temperature in the room and/or adjust the blinds 114 in response to determining that media content is being displayed.

The system 100 can include or be in communication with a user device 110, which can be a mobile device, such as a cellular telephone, a laptop, a tablet computer, desktop computer, or a smartwatch, or any other mobile device. The various sensors and devices can communicate wirelessly via a wireless network 112, for example. In some embodiments, the STB 104 can determine when media content is being displayed in the viewing environment and cause the devices to adjust aspects of the environment. In some embodiments, the system can determine if a movie is playing or a particularly dark movie is playing by listening to the movie and using machine learning to determine the particular movie or type of movie. Thus, the configuration of the room environment can be content-sensitive-meaning a type of content, or the specific content itself, can trigger a configuration different from others. For example, there can be a "Stranger Things" configuration different from a "Monday Night Football" configuration.

Content that is video content can have title, genre, program time (for linear programming), episode, year, actor/actress/director, and other content-specific information (e.g., metadata). In some embodiments, there can also be a third-party service which supplies a content::configuration preset association. In some embodiments, room configuration options may be limited based on the components installed in the room. Therefore, any association is dependent on the limitations of the room itself (where the room is configured as much as possible to an association value or preferred configuration). In some embodiments, the room configurations may be value-based where individual components are supplied with component-specific adjustment values, and alternatively, a configuration may be passed as an overall type or value that permits a separate room configuration monitor to adjust and control each of the room components that need adjustment to achieve the preferred environment.

In some embodiments, the user device 110 controls the system and receives the data from e.g., sensors 109 and 117 and directs e.g., devices 114, 116, and 118 to adjust the environment accordingly. A user can interact with an application on the user device 110 to input information indicating that media content is being displayed and also to set preferences and thresholds for brightness and/or temperature, for example. In some embodiments, the thresholds for brightness and/or temperature can be determined either within the app mentioned above during setup, or learned over time (much like a smart thermostat learns the habits of the user). In addition, time of day and even time of year can be tracked by the device itself.

In some embodiments, the system 100 can receive data related to one or more aspects of the viewing environment from an external source. For example, the system can receive current weather information from a weather service via wireless network 112. Based on the time of day and e.g., cloud cover information from the weather service, the system 100 can adjust blinds 114 to prevent light/solar radiation from entering the viewing environment. In some embodiments, the device can have more than one light sensor. One placed near a window, if applicable, (to determine time of day, sun, clouds, etc.) and one placed or facing in, towards the room to gather ambient light information. In some embodiments, the sensor within the room takes precedence, and is the primary sensor, however if there is an error, the other sensor can be repositioned to act as the primary sensor.

Figure 2:
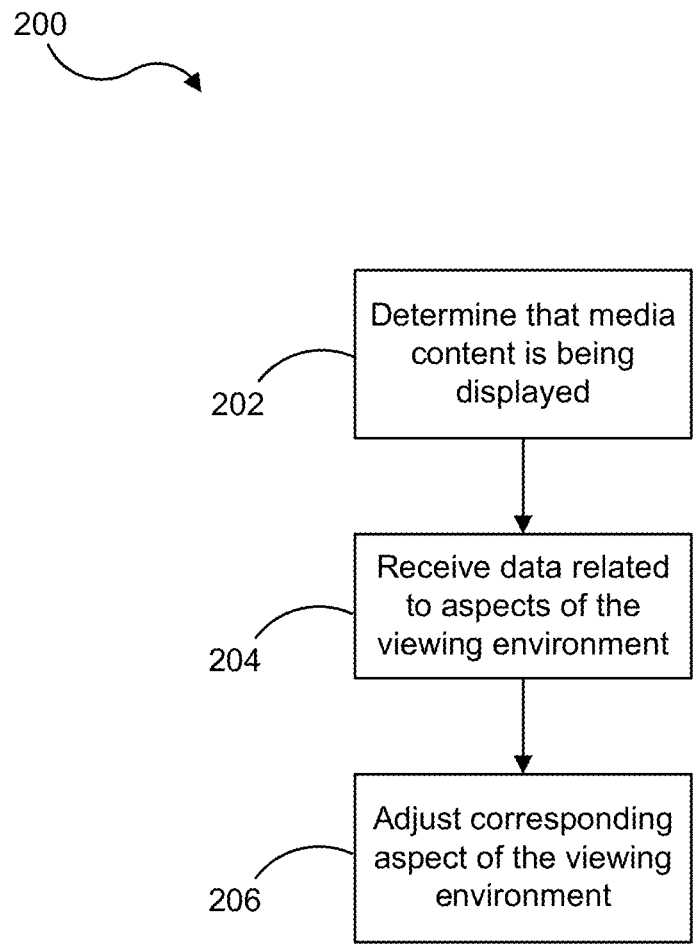
FIG. 2 is a flow diagram showing a method for adjusting a viewing environment according to some embodiments of the disclosed technology.

FIG. 2 is a flow diagram showing a representative method of operation 200 of a processor-based system for adjusting a viewing environment according to some embodiments of the disclosed technology. The method can include, at step 202, determining that media content is being displayed on a display located in the viewing environment. At step 204, data related to one or more aspects of the viewing environment is received. At step 206, a corresponding aspect of the viewing environment is adjusted based on the received data in response to determining that media content is being displayed.

In some embodiments, the data related to one or more aspects of the viewing environment is received from an ambient light sensor and adjusting the corresponding aspect of the viewing environment comprises adjusting a window covering associated with the viewing environment to reduce the amount of light entering the viewing environment through the window covering. In some embodiments, the ambient light sensor is carried by a remote control. In some embodiments, the data related to one or more aspects of the viewing environment is received from a temperature sensor and adjusting the corresponding aspect of the viewing environment comprises adjusting a thermostat associated with the viewing environment. In some embodiments, the data related to one or more aspects of the viewing environment is received from a temperature sensor and adjusting the corresponding aspect of the viewing environment comprises adjusting a window covering associated with the viewing environment to reduce the amount of solar radiation entering the viewing environment through the window covering. In some embodiments, the data related to one or more aspects of the viewing environment is received from an ambient light sensor and adjusting the corresponding aspect of the viewing environment comprises turning off a light located in the viewing environment. In some embodiments, the data related to one or more aspects of the viewing environment is received from a weather report and adjusting the corresponding aspect of the viewing environment comprises adjusting a window covering associated with the viewing environment to reduce the amount of light entering the viewing environment through the window covering.

Figure 3:
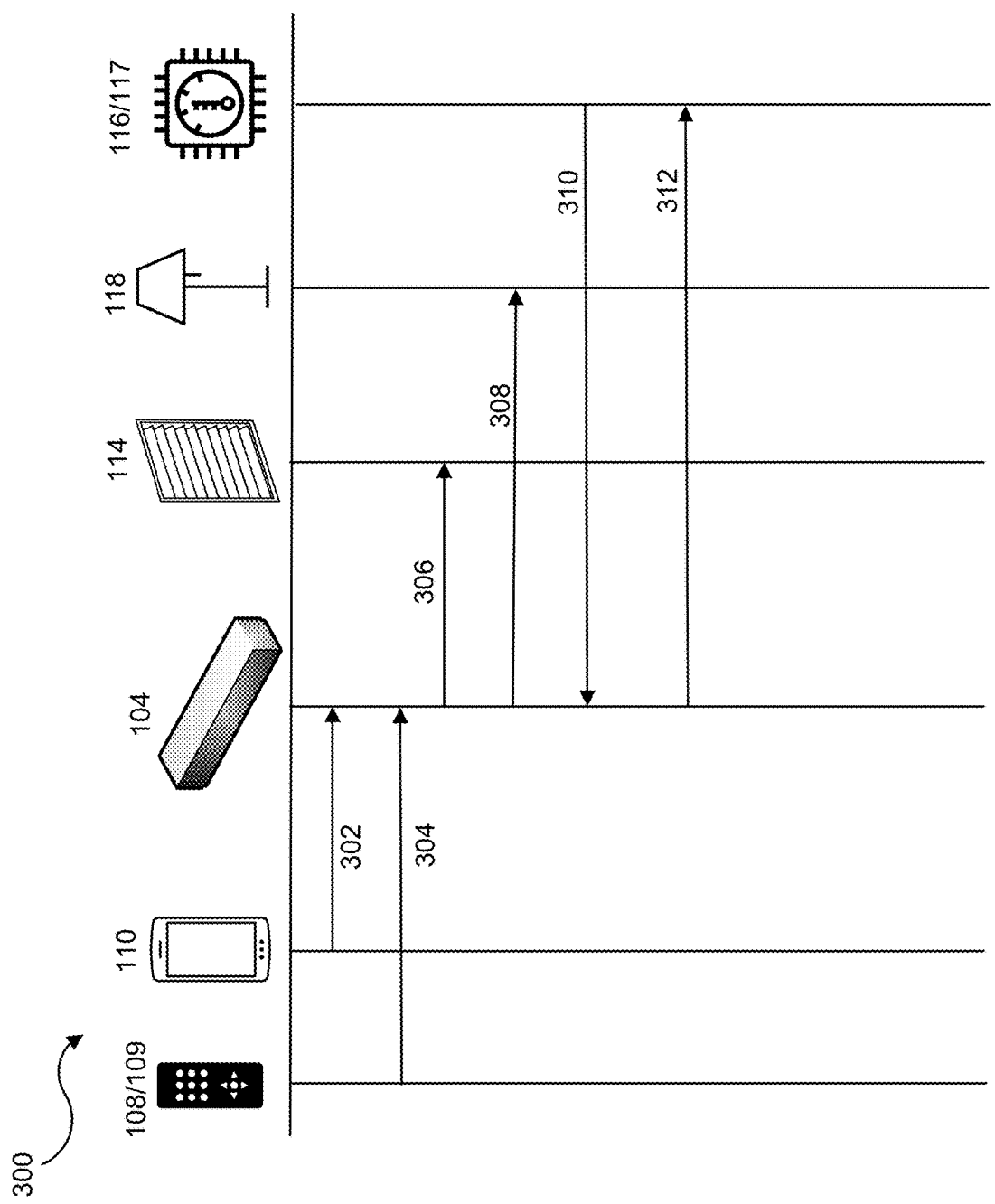
FIG. 3 is a sequence diagram illustrating information flow between system components according to some embodiments of the disclosed technology.

FIG. 3 is a sequence diagram 300 illustrating information flow between system components e.g., STB 104, remote control and light sensor 108/109, mobile device 110, blinds 114, thermostat and temperature sensor 116/117, and light 118, according to some embodiments of the disclosed technology. The STB 104 receives configuration settings 302 from a user device 110 and ambient light data 304 from remote light sensor 109. In response to a determination that media content is being displayed, the STB 104 sends instructions 306 to blinds 114 to close in response to the ambient light data 304. In some embodiments, viewing environment configurations can be generated and presented via a mobile app or an app on the STB. Here, the user can interface with the system and make adjustments as needed. The app can have access to content data and would allow for further tailoring of the environment to the detected content. The STB 104 can also send instructions 308 to light 118 to e.g., turn off in response to the ambient light data 304. In some embodiments, the STB 104 receives temperature data 310 from the temperature sensor 117. In response the STB 104 can send instructions 312 to the thermostat 116 to adjust the temperature in the viewing environment according to the configuration settings 302 received from the user device 110.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
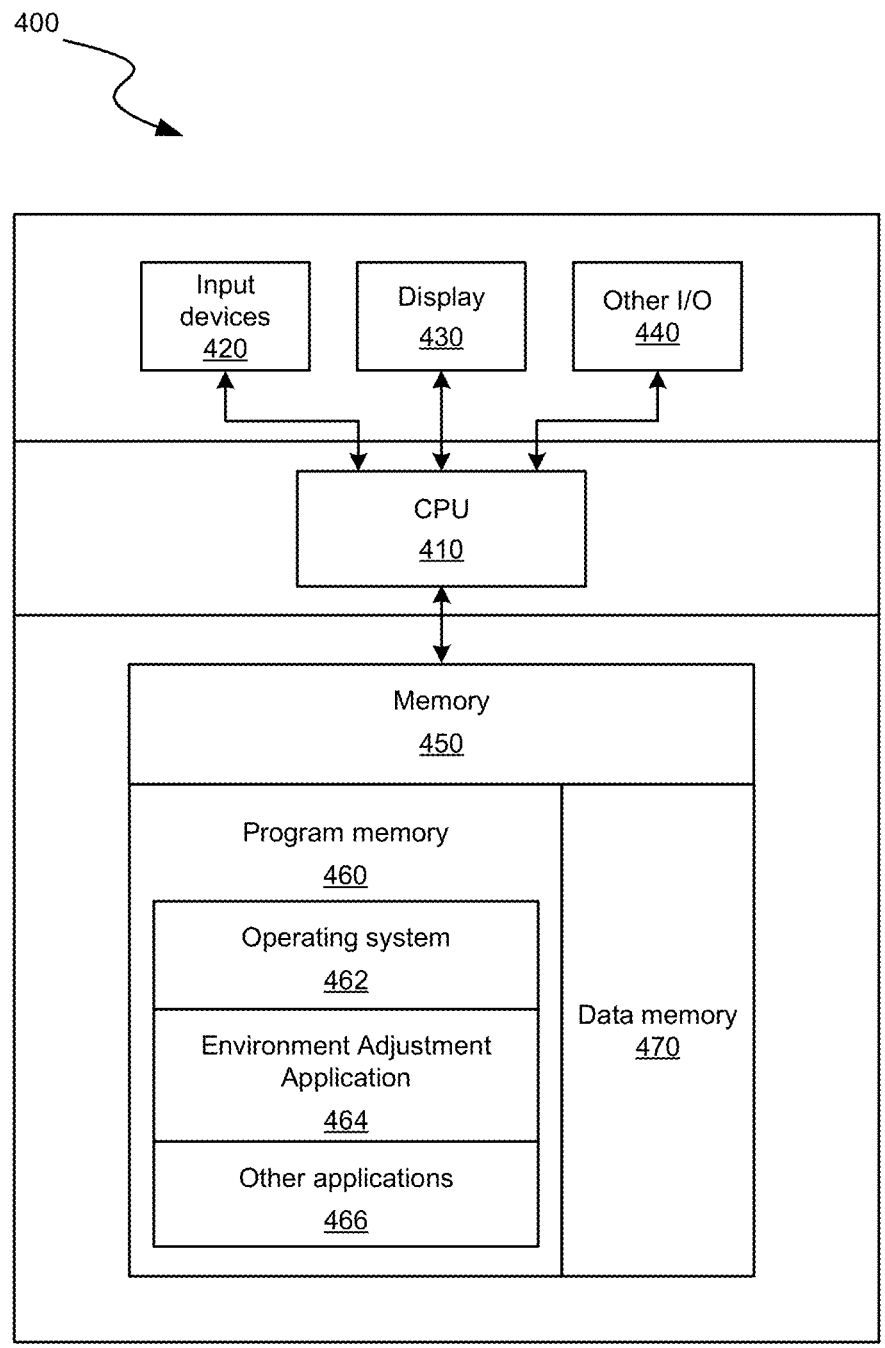
FIG. 4 is a block diagram illustrating an overview of devices on which some implementations can operate.

Several implementations are discussed below in more detail in reference to the figures. FIG. 4 is a block diagram illustrating an overview of devices on which some implementations of the disclosed technology can operate. The devices can comprise hardware components of a device 400. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, a viewing environment adjustment application 464, and other application programs 466. Memory 450 can also include data memory 470 that can include speaker information, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
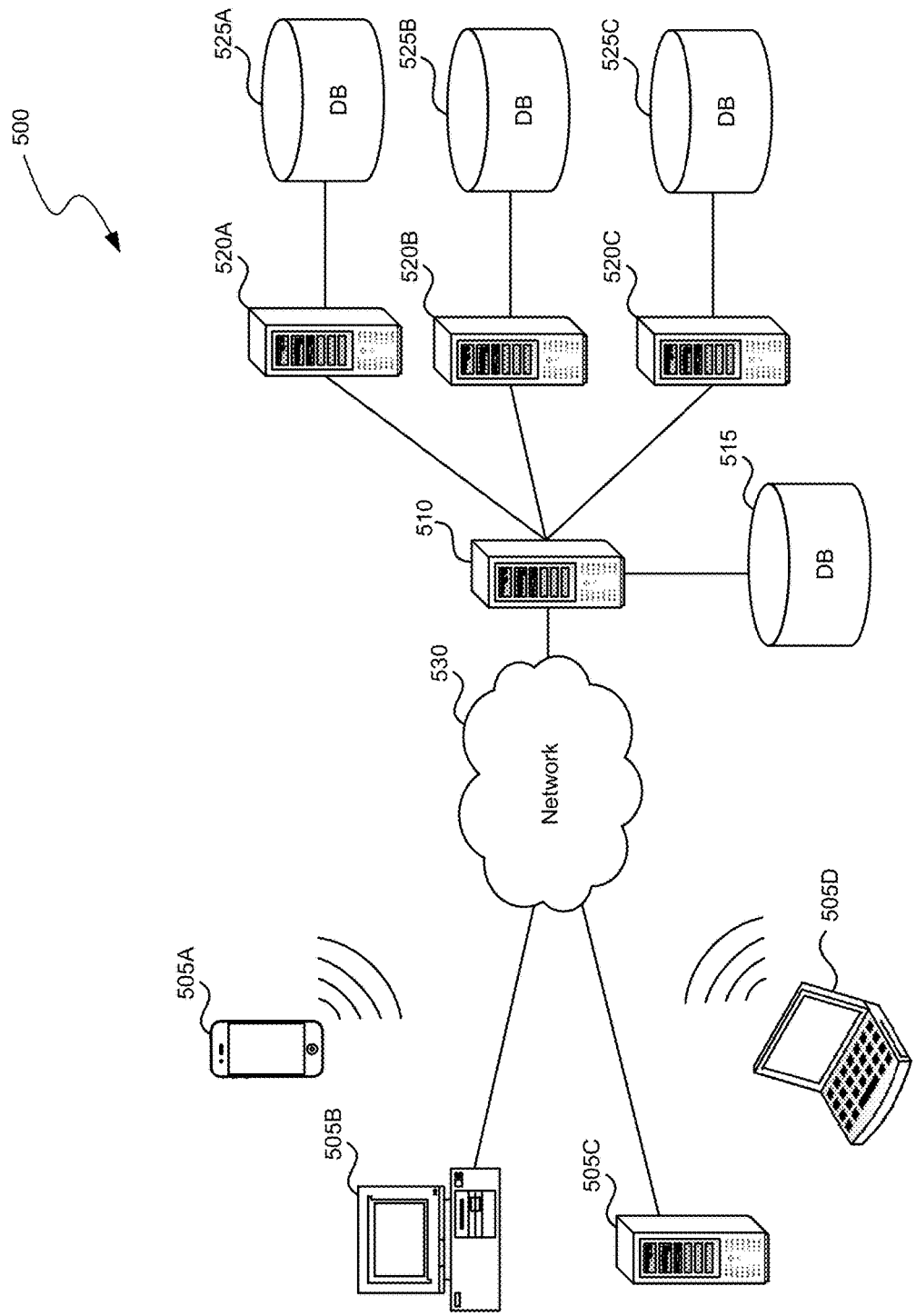
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as speaker information, speaker characteristics (e.g., frequency range and/or timing delay), channel selections, and/or user preferences. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
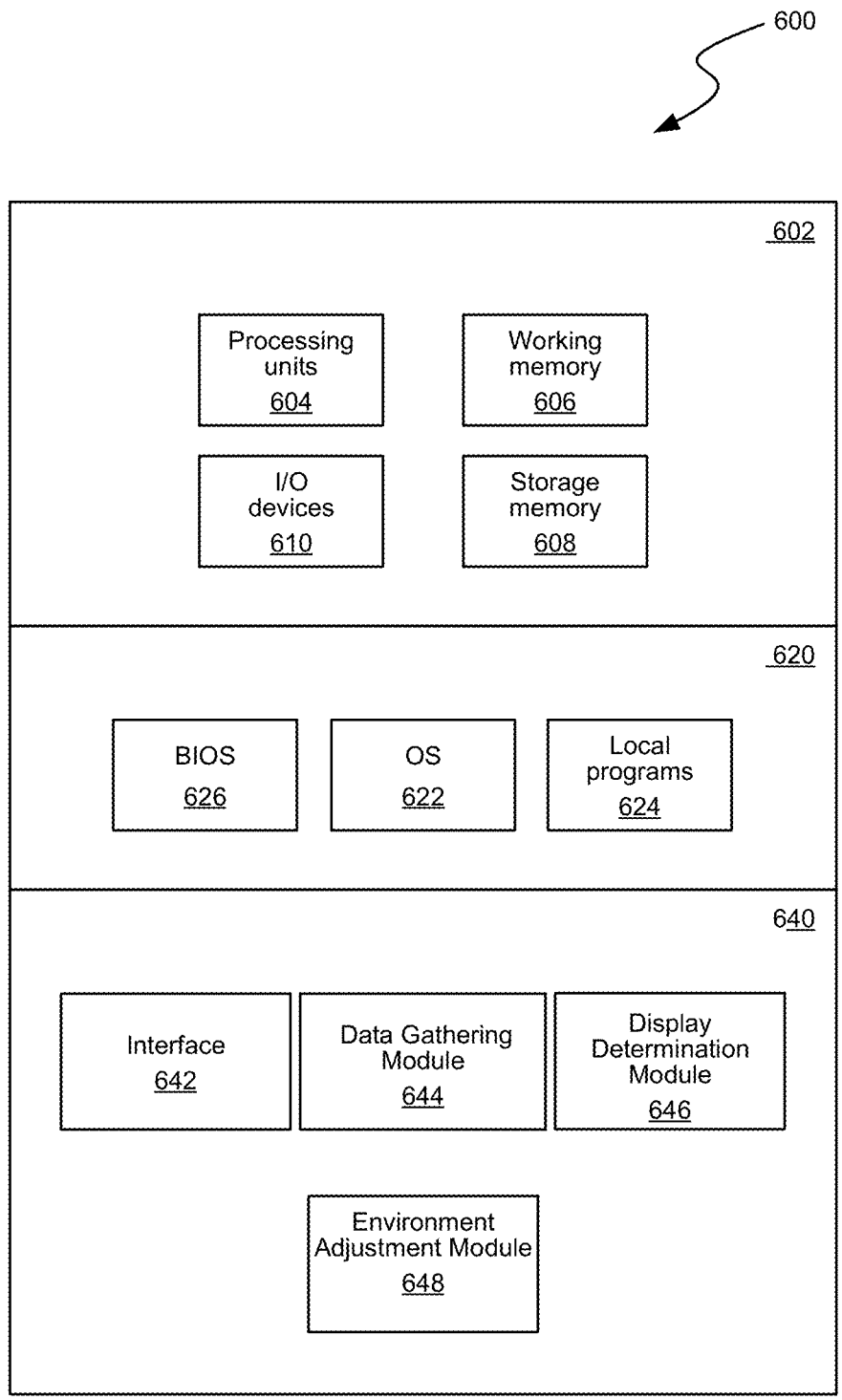
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Components 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624. Specialized components 640 can include a Data Gathering module 644, Display Determination module 646, Environment Adjustment module 648, and components that can be used for transferring data and controlling the specialized components, such as interface 642. In some implementations, components 600 can be in a computing system that is distributed across multiple computing devices or can be an interface to a server-based application executing one or more of specialized components 640.

Those skilled in the art will appreciate that the components illustrated in FIGS. 4-6 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term.

Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A viewing environment adjustment system, comprising:
    one or more sensors each configured to monitor an aspect of a viewing environment;
    one or more processors; and
    one or more memory devices having stored thereon instructions that when executed by the one or more processors cause the one or more processors to:
        determine that a media content is being displayed on a display located in the viewing environment;
        receive data related to one or more aspects of the viewing environment, wherein the data includes weather data from a weather service;
        determine a type of the media content being displayed on the display;
        determine a brightness level of the media content; and
        in response to determining that the media content is being displayed, adjust a corresponding aspect of the viewing environment by adjusting at least one window covering associated with the viewing environment based on the type of the media content being displayed, the brightness level of the media content, and the weather data.

2. The system of claim 1, wherein the data related to one or more aspects of the viewing environment is received from an ambient light sensor, and wherein adjusting the at least one window covering associated with the viewing environment reduces an amount of light entering the viewing environment through the at least one window covering.

3. The system of claim 2, wherein the ambient light sensor is carried by a remote control.

4. The system of claim 1, wherein the data related to one or more aspects of the viewing environment is received from a temperature sensor and wherein adjusting the corresponding aspect of the viewing environment further comprises adjusting a thermostat associated with the viewing environment.

5. The system of claim 1, wherein the data related to one or more aspects of the viewing environment is received from a temperature sensor and wherein adjusting the at least one window covering associated with the viewing environment reduces an amount of solar radiation entering the viewing environment through the at least one window covering.

6. The system of claim 1, wherein the data related to one or more aspects of the viewing environment is received from an ambient light sensor and wherein adjusting the corresponding aspect of the viewing environment further comprises turning off a light located in the viewing environment.

7. A method for adjusting a viewing environment, comprising:
    determining that a media content is being displayed on a display located in the viewing environment;
    receiving data related to one or more aspects of the viewing environment, wherein the data includes weather data from a weather service;
    determining a type of the media content being displayed on the display;
    determining a brightness level of the media content; and in response to determining that the media content is being displayed, adjusting a corresponding aspect of the viewing environment by adjusting at least one window covering associated with the viewing environment based on the type of the media content being displayed the brightness level of the media content, and the weather data.

8. The method of claim 7, wherein the data related to one or more aspects of the viewing environment is received from an ambient light sensor and wherein adjusting the at least one window covering associated with the viewing environment reduces an amount of light entering the viewing environment through the at least one window covering.

9. The method of claim 8, wherein the ambient light sensor is carried by a remote control.

10. The method of claim 7, wherein the data related to one or more aspects of the viewing environment is received from a temperature sensor and wherein adjusting the corresponding aspect of the viewing environment further comprises adjusting a thermostat associated with the viewing environment.

11. The method of claim 7, wherein the data related to one or more aspects of the viewing environment is received from a temperature sensor and wherein adjusting the at least one window covering associated with the viewing environment reduces an amount of solar radiation entering the viewing environment through the at least one window covering.

12. The method of claim 7, wherein the data related to one or more aspects of the viewing environment is received from an ambient light sensor and wherein adjusting the corresponding aspect of the viewing environment further comprises turning off a light located in the viewing environment.

13. The method of claim 7, wherein the data related to one or more aspects of the viewing environment is received from a weather report and wherein adjusting the at least one window covering associated with the viewing environment reduces an amount of light entering the viewing environment through the at least one window covering.

14. One or more non-transitory computer-readable media storing computer-executable instructions that, when executed by one or more processors, cause the one or more processors to perform operations comprising:
  determining that a media content is being displayed on a display located in a viewing environment;
  receiving data related to one or more aspects of the viewing environment, wherein the data includes weather data from a weather service;
  determining a type of the media content being displayed on the display;
  determining a brightness level of the media content; and
  in response to determining that the media content is being displayed, adjusting a corresponding aspect of the viewing environment by adjusting at least one window covering associated with the viewing environment based on the type of the media content being displayed, the brightness level of the media content, and the weather data.

15. The one or more non-transitory computer-readable media of claim 14, wherein the data related to one or more aspects of the viewing environment is received from an ambient light sensor and wherein adjusting the at least one window covering associated with the viewing environment reduces an amount of light entering the viewing environment through the at least one window covering.

16. The one or more non-transitory computer-readable media of claim 15, wherein the ambient light sensor is carried by a remote control.

17. The one or more non-transitory computer-readable media of claim 14, wherein the data related to one or more aspects of the viewing environment is received from a temperature sensor and wherein adjusting the corresponding aspect of the viewing environment further comprises adjusting a thermostat associated with the viewing environment.

18. The one or more non-transitory computer-readable media of claim 14, wherein the data related to one or more aspects of the viewing environment is received from a temperature sensor and adjusting the at least one window covering associated with the viewing environment reduces an amount of solar radiation entering the viewing environment through the at least one window covering.

19. The one or more non-transitory computer-readable media of claim 14, wherein the data related to one or more aspects of the viewing environment is received from an ambient light sensor and wherein adjusting the corresponding aspect of the viewing environment further comprises turning off a light located in the viewing environment.

20. The one or more non-transitory computer-readable media of claim 14, wherein the data related to one or more aspects of the viewing environment is received from a weather report and wherein adjusting the at least one window covering associated with the viewing environment reduces an amount of light entering the viewing environment through the at least one window covering.

* * * * *